United States Patent [19]

Yamamoto

[11] 4,358,282
[45] Nov. 9, 1982

[54] CONSTANT VELOCITY BALL JOINT

[75] Inventor: Toshiaki Yamamoto, Toyota, Japan

[73] Assignee: Toyota Jidosha Kogyo Kabushiki Kaisha, Toyota, Japan

[21] Appl. No.: 212,337

[22] Filed: Dec. 2, 1980

[30] Foreign Application Priority Data

Sep. 18, 1980 [JP] Japan .................... 55-129559

[51] Int. Cl.³ .............................................. F16D 3/34
[52] U.S. Cl. .................................... 464/139; 464/906
[58] Field of Search ............................ 64/21, 8, 7

[56] References Cited

U.S. PATENT DOCUMENTS

| 3,324,682 | 6/1967 | Bendler | 64/21 |
| 4,054,039 | 10/1977 | Takahashi et al. | 64/21 |
| 4,156,353 | 5/1979 | Welschof | 64/21 |
| 4,319,465 | 3/1982 | Ito et al. | 64/21 |
| 4,325,232 | 4/1982 | Girguis | 64/21 |

FOREIGN PATENT DOCUMENTS

| 54-125342 | 9/1979 | Japan | 64/21 |
| 54-125343 | 9/1979 | Japan | 64/21 |
| 1389903 | 4/1975 | United Kingdom | 64/21 |

Primary Examiner—Ira S. Lazarus
Assistant Examiner—Magdalen Moy
Attorney, Agent, or Firm—Cushman, Darby & Cushman

[57] ABSTRACT

A constant velocity ball joint in which each of the rotary members of the bearing portion, such as an outer race, cage and inner race is chamfered at one axial end of inner or outer spherical portion thereof at an angle of 2° to 15° to the line tangent to the axial end and at a chamfering width of 1 mm or greater. Thanks to the provision of chamfering, the breakage of lubricating oil film under application of heavy load is avoided to ensure a smooth rotation of the bearing and high durability of the constant velocity ball joint.

1 Claim, 8 Drawing Figures

CONSTANT VELOCITY BALL JOINT

BACKGROUND OF THE INVENTION

The present invention relates to a constant velocity ball joint. The constant velocity ball joint is a structure capable of transmitting a torque from a drive shaft to a driven shaft crossing the drive shaft at a constant angular velocity. The characteristic feature of the constant velocity ball joint resides in that the maximum joint angle is very large due to the structure of the joint.

The constant velocity ball joint is composed of an outer race provided with a plurality of ball rolling grooves formed in the inner peripheral surface at an axial end thereof, an inner race provided with a plurality of ball rolling grooves formed in the outer peripheral surface at the other axial end thereof, a plurality of balls received by the ball rolling grooves, and a cage adapted to hold these balls at predetermined positions. The centers of the ball rolling grooves formed in the peripheral surfaces of both races are offset by equal distance from the angular center of the joint in both directions so as to control the rotation of the cage and balls to keep the balls always on the bisector plane of the angle formed between the drive and driven shafts to prevent the fluctuation of rotation speed and torque.

However, when an imperfect spherical bearing rotates to resume the parallel posture from a state inclined due to an axial thrust load, a scoop angle and a relief angle are formed at one sphere end of point of contact between the inner and outer spheres to cause a machining action to cut and break the film of grease as the lubricant to hinder the smooth rotation of the bearing.

SUMMARY OF THE INVENTION

It is, therefore, a major object of the invention to overcome the above-described problems of the prior art by providing an improved constant velocity ball joint having superior durability at heavy load.

To this end, according to the invention, there is provided a constant velocity ball joint characterized in that a specific chamfering is effected on axial end portion of the inner and outer spherical portions of the outer race, cage and inner race which are the rotary members of the bearing portion.

In the constant velocity ball joint of the invention, the breakage of lubricating oil film at the spherical bearing portion is avoided even under application of a heavy load, by a simple chamfering effected in a specific manner on the axial end portion of the inner or outer spherical portion of the outer race, inner race, cage and so forth, thereby to ensure a smooth rotation of the bearing and higher durability of the constant velocity ball joint.

DESCRIPTION OF THE PREFERRED EMBODIMENTS

The invention will be described hereinunder in more detail with specific embodiments in conjunction with the accompanying drawings.

Figure 1:
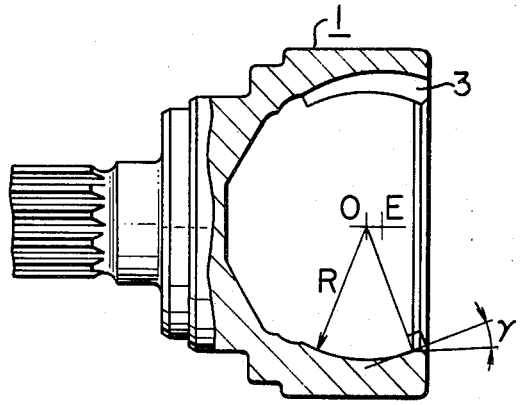
FIGS. 1 to 4 are sectional views of an outer race, inner race, cage and a constant velocity ball joint as an assembly, having linearly chamfered axial ends in accordance with the invention.
Figure 2:
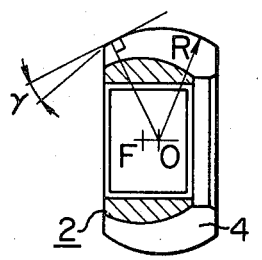

Referring to FIGS. 1 and 2 which are sectional views of an outer race 1 and an inner race 2, respectively, of a constant velocity ball joint, ball rolling grooves 3, 4 are formed along arcs which are centered at points E and F offset from the angular center 0 of the ball joint. A plurality of balls 5 received by the ball rolling grooves 3, 4 are restrained and held by a cage 6 shown at FIG. 6.

Figure 4:
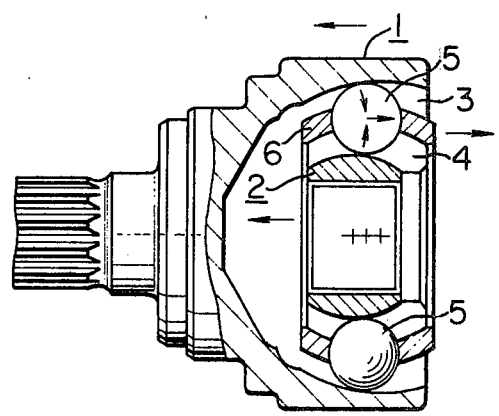

FIG. 4 shows a constant velocity ball joint in the assembled state, constituted by the abovementioned members.

As a torque is applied to this constant velocity ball joint, a force is exerted to displace the balls 5, i.e. the cage 6, toward the outside. In consequence, the spherical bearing portion has to rotate under the presence of an axial thrust as illustrated in FIG. 4.

Figure 5:
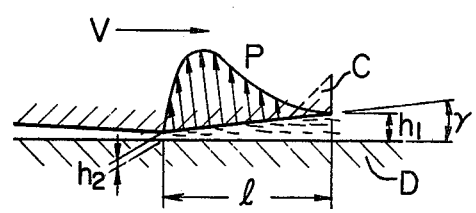
FIG. 5 is a chart showing a dynamic pressure distribution at the contact point in a conventional constant velocity ball joint.

FIG. 5 is a schematic illustration of a slide contact point between two members. Assuming here that a member C slides along the surface of a flat member D at a velocity V and with an wedging angle $\gamma$ while keeping a clearance $h_2$; the total $P_o$ of the pressure P is given by the following equation:

$$P_o = \frac{6\mu v l^2}{(k-1)^2 h_2^2}\left[\ln k - \frac{2(k-1)}{k+2}\right]$$

where $\mu$ represents the viscosity index of a grease put between two members C and D and k is given by $k = h_1/h_2$. From the condition of $dP/dK = 0$, the total pressure $P_o$ takes the maximum value when k takes a value of $k = 2.2$. Provided that $\mu$ and v are constant, the total pressure $P_o$ becomes greater as l is increased. It is, therefore, possible to improve the lubrication of the contact region by effecting a chamfering on the inner and outer spherical portions of the constant velocity ball joint at an angle of 2° to 15° to the tangential line and with a width of 1 mm or greater.

Figure 6:
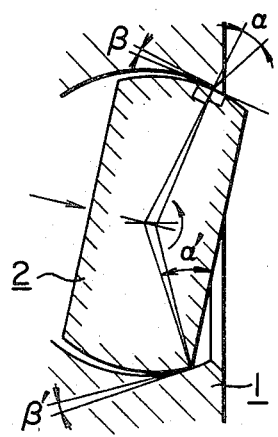
FIG. 6 is a sectional view of a spherical bearing portion of the conventional constant velocity ball joint.

Supposing here that no chamfering is made on the inner and outer spherical portions of the constant velocity ball joint, a scooping angle $-\alpha$ (and $-\alpha'$) and a relief angle $\beta(\beta')$ are as shown in FIG. 6, when the member is moved in the direction of arrow to act as if it is a cutting tool to cut and break the film of grease.

Figure 3:
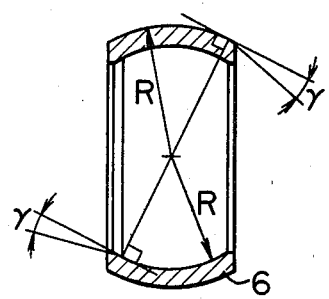

This problem, however, is fairly overcome by the arrangement of the invention in which the inner and outer spherical portions of the constant velocity ball joint are chamfered. Namely, in the outer race shown in FIG. 1, the end of the inner spherical surface adjacent to the boot is chamfered at an angle $\gamma$ (2° to 15°) to the tangential line. Also, in the inner race shown in FIG. 2, the end of the outer spherical surface opposite to the boot is chamfered at the angle $\gamma$ to the tangential line. Further, in the cage shown in FIG. 3, the end of the outer spherical portion adjacent to the boot and the end of the inner spherical portion opposite to the boot are chamfered at angle $\gamma$ to the respective tangential lines.

Figure 7:
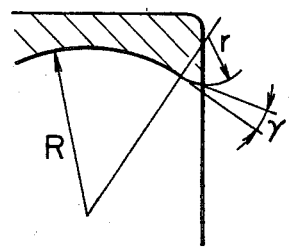
FIG. 7 is a sectional view of an essential part of an outer race of a constant velocity ball joint of the invention, having an arcuately chamfered axial end.
Figure 8:
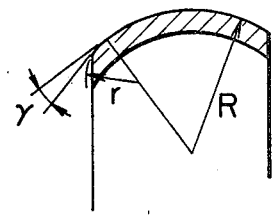
FIG. 8 is a sectional view of an essential part of an inner race of a constant velocity ball joint in accordance with the invention, having an arcuately chamfered axial end.

The chamfering need not always be made linear. Namely, the chamfering may be made in the form of an arc approximating the line of the angle γ. FIGS. 7 and 8 show examples of the inner and outer spherical portions on which chamfering is made in an arcuate form. Preferably, the chamfering width is 1 mm or greater. The chamfering may be made, but not essentially, at both of left and right side portions. It is essential, however, that the chamfering be made at at least the above-described four portions of the constant velocity ball joint.

What is claimed is:

1. A constant velocity ball joint comprising: an outer race provided at one axial end with a plurality of ball rolling grooves formed in the inner peripheral spherical surface thereof; an inner race provided at its end opposing to said one axial end with a plurality of ball rolling grooves formed in the outer peripheral spherical surface thereof; a plurality of balls received by said ball rolling grooves; and a cage having outer and inner spherical surfaces disposed between said ball rolling grooves of said outer race and said ball receiving grooves of said inner race and adapted to hold and restrain said balls, characterized in that said inner surface of said outer race and said outer surface of said inner race are chamfered at said ends thereof and said outer and inner surfaces of said cage are chamfered at the respective ends thereof corresponding to said outer race end and said inner race end, said chamfering being at an angle of from about 2° to about 15° to a line tangent to each said end and having width of at least 1 mm.

* * * * *